US010392896B1

(12) United States Patent
VanderLans et al.

(10) Patent No.: US 10,392,896 B1
(45) Date of Patent: Aug. 27, 2019

(54) FRUSTUM PLUGS FOR PIPELINES

(71) Applicant: Vanderlans & Sons, Inc., Lodi, CA (US)

(72) Inventors: Eric G. VanderLans, Lodi, CA (US); Nicholas A. Bettencourt, Lodi, CA (US); Latruce Amos, Stockton, CA (US)

(73) Assignee: Vanderlans & Sons, Inc., Lodi, CA (US)

( * ) Notice: Subject to any disclaimer, the term of this patent is extended or adjusted under 35 U.S.C. 154(b) by 0 days.

(21) Appl. No.: 15/695,893

(22) Filed: Sep. 5, 2017

Related U.S. Application Data

(60) Provisional application No. 62/383,867, filed on Sep. 6, 2016.

(51) Int. Cl.
*F16L 55/12* (2006.01)
*E21B 33/127* (2006.01)
*E21B 33/128* (2006.01)
*E21B 33/00* (2006.01)

(52) U.S. Cl.
CPC ...... *E21B 33/1277* (2013.01); *E21B 33/1285* (2013.01); *E21B 2033/005* (2013.01)

(58) Field of Classification Search
CPC ............ E21B 33/1277; E21B 33/1285; E21B 2033/005
USPC ............................................... 138/90, 93, 89
See application file for complete search history.

(56) References Cited

U.S. PATENT DOCUMENTS

| 2,124,710 | A | * | 7/1938 | Pipes | E21B 33/16 138/89 |
| 2,559,210 | A | * | 7/1951 | Bradley | F16L 55/132 138/90 |
| 2,734,582 | A | * | 2/1956 | Bagnell | E21B 33/127 277/334 |
| 2,843,208 | A | * | 7/1958 | Blood | E21B 33/1243 166/100 |
| 3,834,421 | A | * | 9/1974 | Daley | F16L 55/16455 138/93 |
| 4,413,653 | A | * | 11/1983 | Carter, Jr. | G01N 3/12 138/89 |
| 4,462,394 | A | * | 7/1984 | Jacobs | A61B 17/8808 606/192 |
| 4,526,207 | A | * | 7/1985 | Burkley | F16L 55/134 138/89 |
| 4,591,477 | A | * | 5/1986 | Rettew | G21C 13/067 138/89 |

(Continued)

*Primary Examiner* — James F Hook
(74) *Attorney, Agent, or Firm* — Heisler & Associates

(57) ABSTRACT

The plug includes a rigid tapering frustum with an upstream end having a larger diameter than a downstream end. A bladder is located outboard of the frustum and preferably fastened to the frustum. The bladder preferably has a toroidal form. A fluid fill system extends into an interior of the bladder to provide fluid for inflating or deflating the bladder. When the bladder is inflated with fluid passing into the interior, an outer wall of the bladder is expanded against a wall of a pipe where the plug is located, to hold the plug in place. As pipeline fluid forces act downstream on the frustum of the plug, the frustum moves slightly downstream, exerting a radial force through the bladder and against the wall of the pipe, so that pressure within the pipe and upstream of the plug enhances radial force with which the bladder engages the pipe wall.

17 Claims, 3 Drawing Sheets

(56) References Cited

U.S. PATENT DOCUMENTS

| | | | | |
|---|---|---|---|---|
| 4,614,206 A | * | 9/1986 | Mathison | F16K 35/06 138/89 |
| 4,957,215 A | * | 9/1990 | Evans | F16L 55/11 138/89 |
| 5,724,994 A | * | 3/1998 | Simon | A61F 2/0009 128/885 |
| 7,452,161 B2 | * | 11/2008 | Freyer | F16L 55/132 138/89 |

* cited by examiner

FRUSTUM PLUGS FOR PIPELINES

CROSS-REFERENCE TO RELATED APPLICATIONS

This application claims benefit under Title 35, United States Code § 119(e) of U.S. Provisional Application No. 62/383,867 filed on Sep. 6, 2016.

FIELD OF THE INVENTION

The following invention relates to plugs for use in pipes to block the pipes or pipelines, typically on a temporary basis. More particularly, this invention relates to plugs for pipes and pipelines which are configured to avoid slipping within the pipeline even when high pressures are exerted upon the plug, by converting at least a portion of the high pressure exerted on the plug into enhanced radial pipeline engaging forces.

BACKGROUND OF THE INVENTION

In performing maintenance, inspections and other work related to pipelines, it is often desirable to plug the pipeline to prevent (or control) flow through a section thereof. Examples of pipelines which require plugs to be used therein include sewer pipelines, water delivery pipelines and pipelines for delivery of various gases and liquids. Prior art pipe plugs generally include a cylindrical plug formed of rubber or other elastic materials which are provided with sufficient thickness and selected from appropriate materials to exhibit high strength but still maintaining elasticity. The plug has a hollow interior to which a source of compressed gas is connected.

The plug is positioned where desired within the pipeline and then compressed air is fed to an interior of the plug. The plug expands under this internal pressure until an outer wall of the plug expands and comes into contact with the inner diameter of the pipeline. By adding additional pressure, engagement between the plug and the inner wall of the pipeline can be increased so that the plug will resist movement. Generally, this resistance to movement is dependent upon the coefficient of friction between the inner wall of the pipeline and the outer wall of the plug as well as the force exerted laterally by the plug upon the pipeline inner wall, generally correlating with the pressure within the plug.

Typically, such plugs can only handle a pipeline pressure outside of the plug of 15 to 25 psi before the plug will begin to move within the pipeline. As it is often necessary for pressures greater than this to be withstood by the plug, various restrains are known to hold the plug in place and to assist in resisting this pipeline pressure. Installment of such restraints adds to the complexity of the plug installation process. Accordingly, a need exists for a pipeline plug which is highly resistant to movement under pipeline pressure applied to the plug, so that such blocking or other restraint can be avoided while still maintaining the plug positioned where desired.

SUMMARY OF THE INVENTION

The plug of this invention includes two basic parts including a frustum of hollow circular cross-section (cut perpendicular to the pipe central axis) and an inflatable bladder. The frustum is formed of a rigid material, typically steel, but potentially other metals or other rigid materials. This frustum has a tapering form between a larger diameter upstream end and a smaller diameter downstream end. The larger diameter end is generally that end of the overall plug which is oriented upstream and hence experiences the pressure within the pipeline to be resisted by the plug when installed within a pipe.

The frustum preferably has a substantially constant taper between the larger diameter end and the smaller diameter end, except that at the larger diameter end a collar portion thereof has a constant diameter. As an option, tapers other than constant tapers could be utilized. In one embodiment, the diameter of the frustum is provided for fitting within an eighteen inch diameter pipe with the frustum having a diameter of fourteen inches. This fourteen inches is maintained for the upstream portion of the frustum, such as for approximately three inches of the frustum. A diameter of the frustum then tapers down to the smaller diameter end, with the smaller diameter end in one embodiment sized at eight inches in diameter. The cylindrical collar at the large diameter end of the frustum preferably has a series of holes therein which can receive bolts or other fasteners for fastening to the bladder which is coupled to the frustum on an exterior surface thereof. As an option, adhesives or other fasteners could alternatively be utilized to secure the upstream end of the bladder to the large diameter end of the frustum.

Some plugs are configured to completely stop flow, while other plugs are in the form of bypass plugs which can allow flow through a center thereof, either unrestricted or with restriction, such as through a valve, which valve can be passive (i.e. a back flow or check valve) or active, such as a valve which can be controlled by an operator. In other embodiments, the frustum can be closed off so that the plug completely resists flow therethrough.

The bladder portion of the plug has a generally toroidal form but also tapers in a conical fashion from a larger diameter at the upstream end thereof to a smaller diameter at the downstream end thereof. The bladder doubles back on itself at the upstream end and then either fastens to the frustum or continues to reattach to itself at the upstream end to cause the bladder to be toroidal. The bladder preferably has a wall thickness of approximately one inch (at least on portions thereof which come into contact with the pipe wall) and is bolted at its upstream end to the large diameter end of the frustum. Most preferably, the downstream end doubles back and seals to itself near the upstream end where it bolts or otherwise attaches to the frustum.

Holes pass through the frustum at midpoints in the tapering wall thereof through which pressurizing fluid can be passed to fill the interior of the bladder (or a space between the outer wall of the frustum and the inner wall of the bladder). Preferably, this fluid is an incompressible fluid, such as water. A hose could be connected directly to one hole (or each hole) passing through the wall of the frustum and be fed from a source of pressurized fluid of appropriate type (either from upstream or downstream of the plug). This pressurized fluid is supplied and begins to fill this space. As this space is filled, the bladder bulges outwardly and comes into contact with the pipeline wall.

As it is pressurized the bladder on the small end rolls off the frustum toward the large end, getting larger in diameter until it makes contact with the pipe's inner walls. With the water filled bladder making contact between the inner pipe wall and the frustum it will form a solid mass in the pipe. The inflated bladder will have a conical shape on the inside center with the small opening on the downstream end opposite the pressure source. As pressure pushes on the large end of the frustum it is forced into the small opening of the torroidal bladder. This creates more pressure between the frustum bladder and pipe wall, causing the seal to get tighter and tighter and wedge itself in position. As one example, pressurized fluid of an incompressible type is supplied at up to 35 psi into this interior space.

Pressure can be applied from the upstream side against the plug, coming into contact with the large diameter end of the frustum and the upstream end of the bladder. As this pipeline pressure is encountered, it tends to push the frustum in a downstream direction. This causes a volume of the space between the frustum and the bladder to be decreased slightly, increasing the pressure therein. Thus, as the pipeline pressure becomes greater and greater, the frustum moves downstream slightly to a greater and greater extent, and further increases the pressure between the frustum and the bladder, thus more and more securely forcing the bladder wall against the pipeline wall to secure the plug within the pipeline. Thus, as greater and greater pressures are experienced within the pipeline, the plug resists these pressures by becoming tighter and tighter. A plug is thus provided which can withstand more than the typical 15 to 25 psi of pipeline pressure without movement.

In the embodiment depicted, when 150 psi of pipeline pressure is encountered on the upstream side of the plug, the interior pressure between the frustum wall and the bladder wall reaches 225 psi. Thus, for plug application in pipelines where pressures around 150 psi or less are to be withheld by the plug, this invention provides a plug which does not require any blocking or other securing within the pipeline and can merely be filled with pressurized liquid, once deployed at the desired location, and maintains its location within the pipe.

OBJECTS OF THE INVENTION

Accordingly, a primary object of the present invention is to provide a plug for a pipeline which can be placed within a pipeline and deployed to at least partially block the pipeline.

Another object of the present invention is to provide a pipeline plug which resists displacement due to fluid pressure forces acting downstream on the plug within the pipeline.

Another object of the present invention is to provide a pipeline plug which is easy to deploy and easy to expand into engagement with walls of the pipeline at a desired location, as well as easy to deflate and remove.

Another object of the present invention is to provide a pipeline plug which exerts a greater and greater wall engagement force as greater and greater pressures are exerted upon the plug within the pipe.

Another object of the present invention is to provide a method for at least partially plugging a pipeline.

Another object to the present invention is to provide a pipeline plug which can be fitted with accessories such as valves, bypass lines, sensors and other pipeline equipment within the pipeline.

Another object of the present invention is to avoid pipeline damage from overexertion of forces against walls of the pipeline.

Another object of the present invention is to provide a pipeline plug which is of simple manufacture to facilitate low-cost and high-quality manufacture thereof and reliable operation.

Other further objects of the present invention will become apparent from a careful reading of the included drawing figures, the claims and detailed description of the invention.

DESCRIPTION OF THE PREFERRED EMBODIMENT

Figure 1:
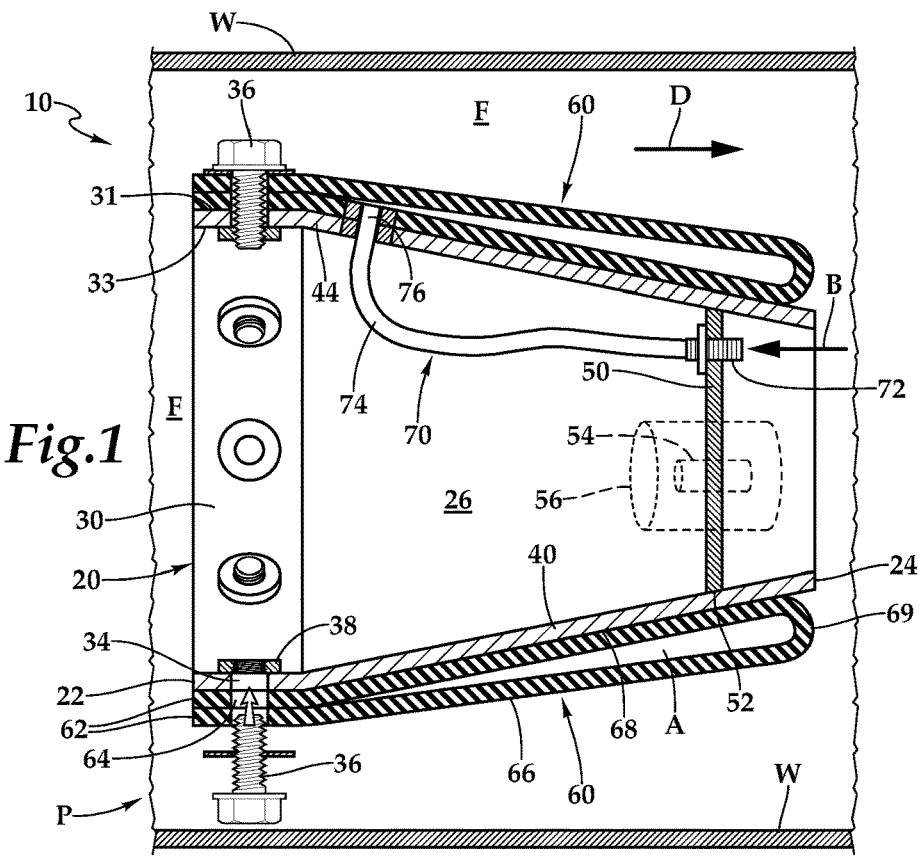
FIG. 1 is a full sectional view of a section of pipeline with the plug of this invention located therein before inflation thereof.

Referring to the drawings, wherein like reference numerals represent like parts throughout the various drawing figures, reference numeral 10 is directed to a plug for placement within a pipeline P to at least partially block flow of fluid F through the pipeline P. The plug 10 includes a bladder 60 which can be filled with fluid to expand the bladder 60 against a wall W of the pipeline P and cause the plug 10 to engage the wall W of the pipeline P to plug the pipeline P.

Figure 2:
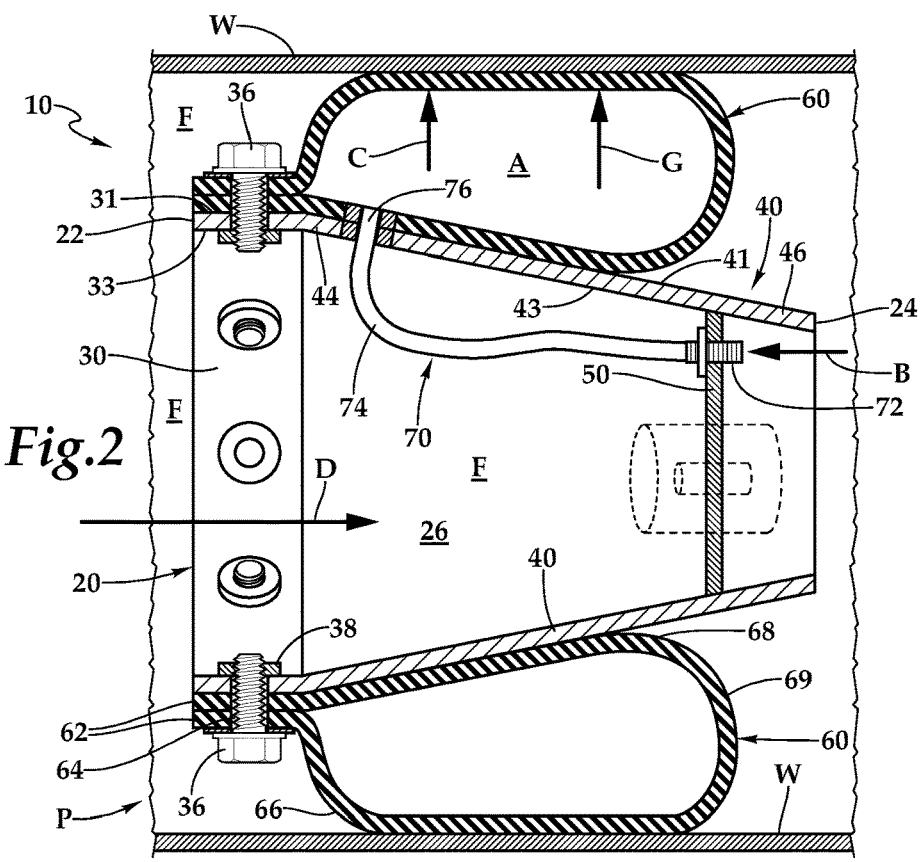
FIG. 2 is a full sectional view of that which is shown in FIG. 1, but after inflation of the plug for at least partial blocking of a flow through the plug within the pipeline.
Figure 3:
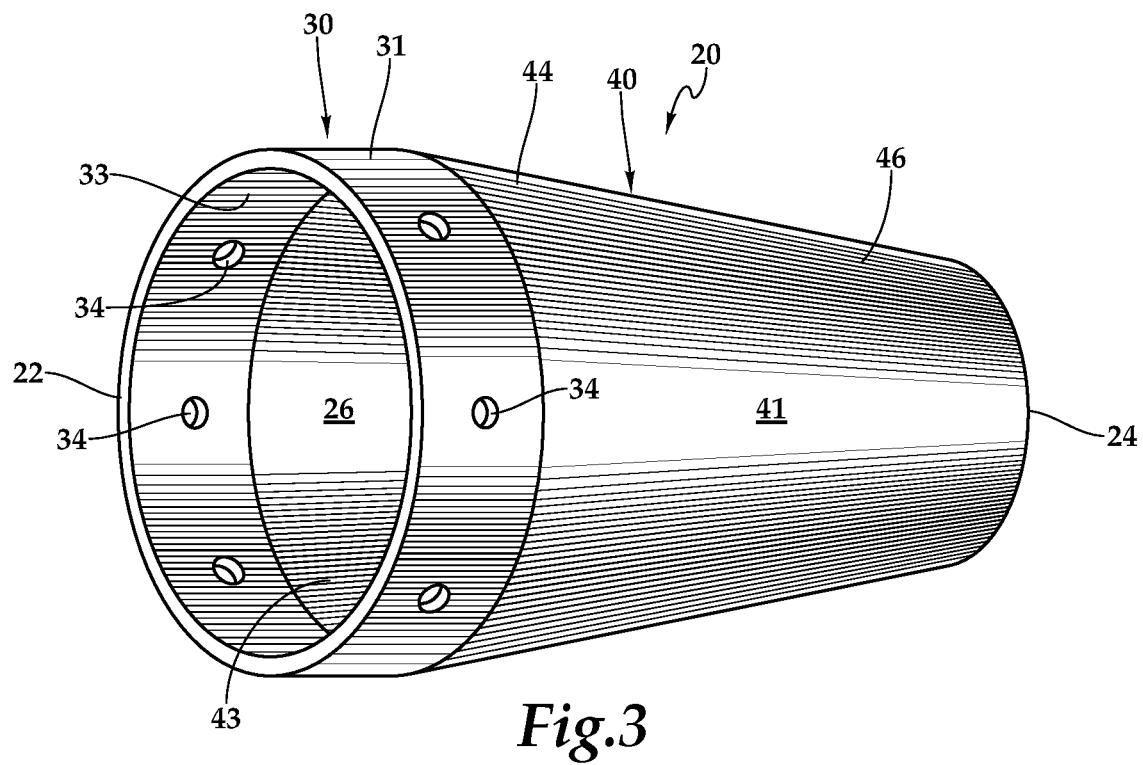
FIG. 3 is a perspective view of a frustum portion of the plug of FIGS. 1 and 2, viewed from a partially upstream direction.
Figure 4:
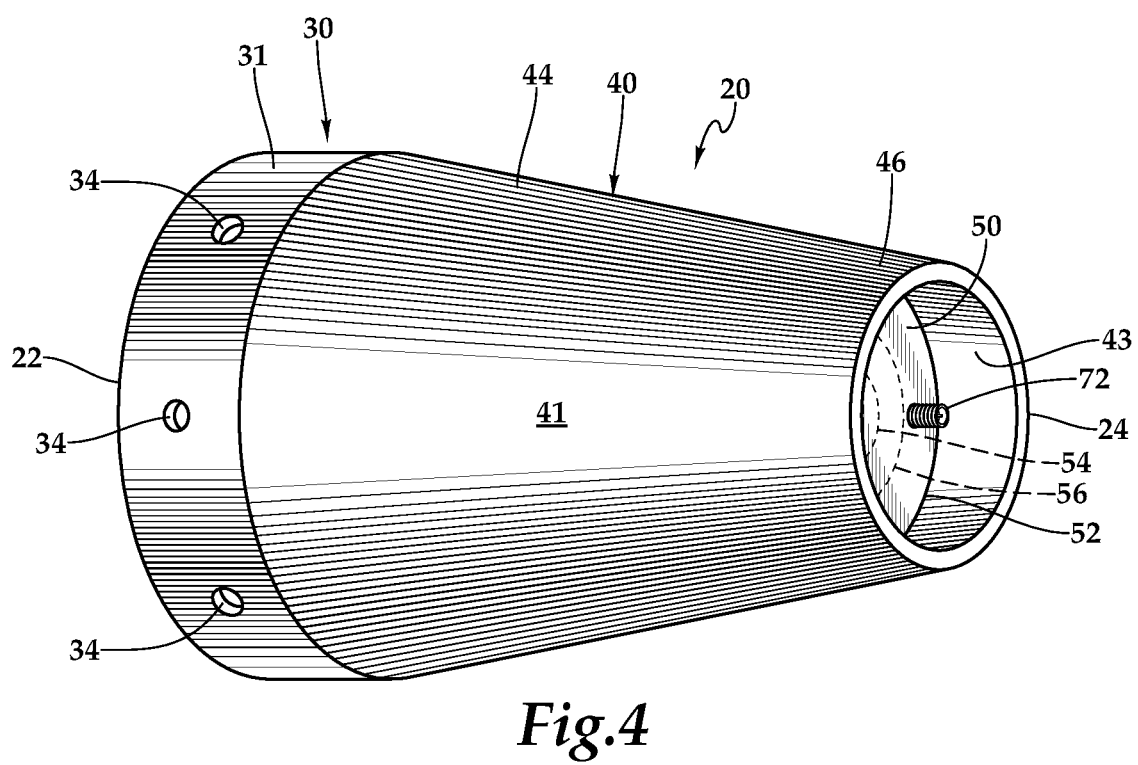
FIG. 4 is a perspective view of the frustum portion of the plug of FIGS. 1 and 2, viewed from a partially downstream direction.
Figure 5:
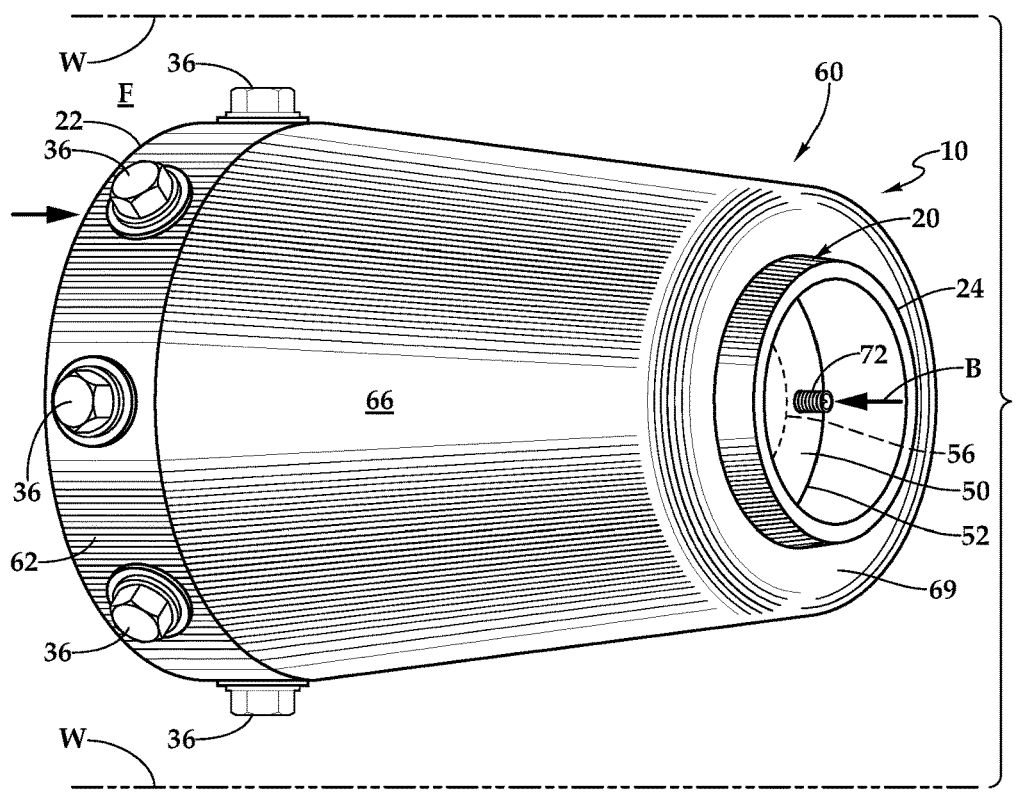
FIG. 5 is a perspective view of the plug of FIGS. 1 and 2 viewed from a partially downstream direction and with a bladder of the plug deflated.
Figure 6:
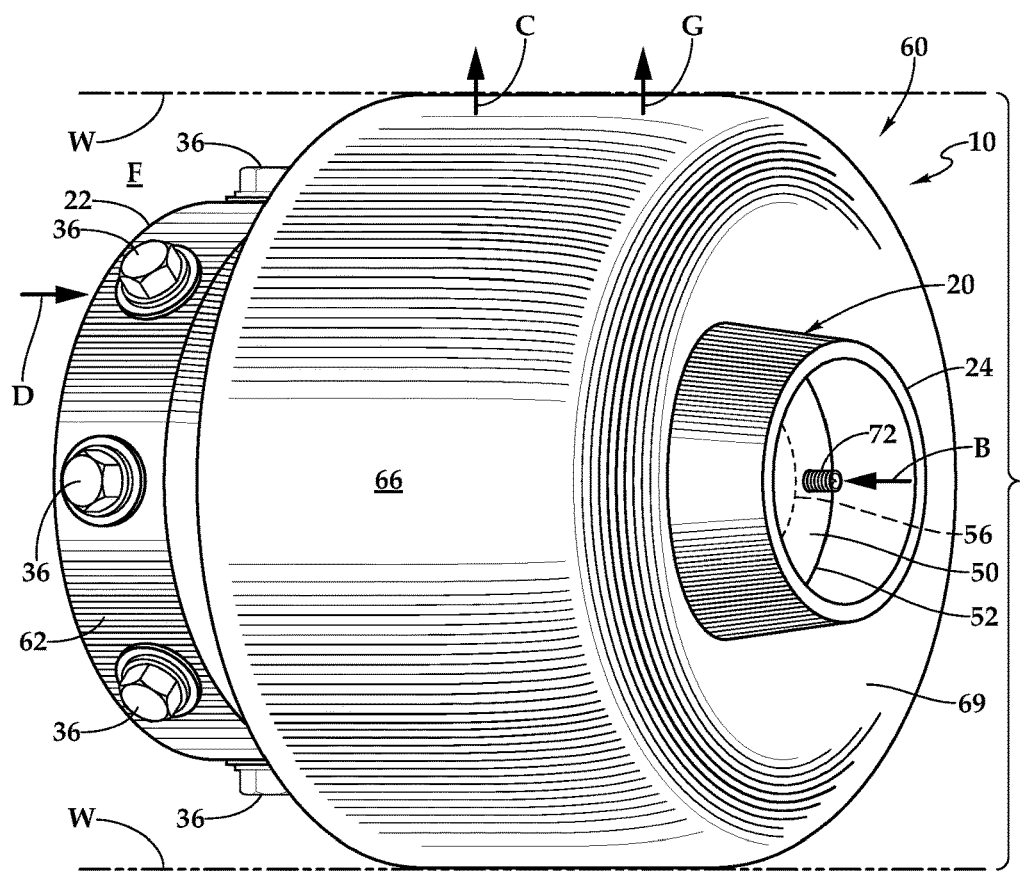
FIG. 6 is a perspective view of the plug out of FIGS. 1 and 2 viewed from a partially downstream direction and with the bladder of the plug inflated and engaging the wall of the pipe.

In essence, and with particular reference to FIGS. 1 and 2, basic details of the plug 10 are described, according to a preferred embodiment. The plug 10 includes a rigid frustum 20 which preferably includes a collar 30 on an upstream portion thereof and a taper 40 on a downstream portion thereof. A bulkhead 50 preferably spans an interior of the frustum 20 at the downstream portion of the frustum 20. A bladder 60, such as of toroidal form, is located outboard of an outer surface of the frustum 20. The bladder 60 has an interior which can be filled with fluid from a fill system 70 to cause the bladder 60 to be inflated (and deflated). Inflation of the bladder 60 against the wall W of the pipeline P allows the plug 10 to be secured in place. Fluid F forces acting in a downstream direction within the pipeline P cause the frustum 20 to move downstream slightly and exert an additional radial force against the bladder 60, increasing force with which the bladder 60 engages the wall W of the pipeline P, such that the plug 10 responds to increased pipeline pressure by increasing radial force by the bladder 60 upon the wall W of the pipeline P to prevent slippage of the plug 10.

More specifically, and with particular reference to FIGS. 1-4, details of the frustum 20 portion of the plug 10 are described, according to this preferred embodiment. The frustum 20 is a substantially rigid structure having a generally tubular form and which tapers from a larger width/diameter at an upstream end 22 to a lesser width/diameter at a downstream end 24. The frustum 20 is preferably hollow at an interior 26 inboard of a wall of the frustum 20. The frustum 20 preferably is radially symmetrical and thus largely frusto-conical in form. However, the frustum 20 could have a non-circular cross-section or be radially asymmetrical, especially to accommodate pipelines P which do not have a circular cross-section, or for use with bladders 60 which can accommodate a non-circular cross-section on interior portions of the bladder 60 against the frustum 20, while external portions of the bladder 60 can maintain a circular or other cross-section matching that of the pipeline P.

Most preferably, the frustum 20 includes a collar 30 at the upstream end 22 and a taper 40 at the downstream end 24. The collar 30 and taper 40 are preferably each formed of common rigid materials, such as steel and preferably with similar thicknesses between inner and outer surfaces. The collar 30 is preferably cylindrical in form and includes an outer surface 31 and a cylindrical inner surface 33, defining a thickness of the wall of the frustum 20 at the collar 30, such as a thickness of approximately ⅛ inch to ¼ inch.

Most preferably, the bladder 60 is attached to the frustum 20 at the collar 30. In this preferred embodiment, such attachment of the bladder 60 to the frustum 20 occurs through fasteners, and these fasteners are preferably bolts 36 which attach to holes 34 in the collar 30. Nuts 38 are preferably captured to the collar 30 in a permanent manner (or hole 34 of the collar 30 can be threaded with female threads) and preferably with these nuts 38 captured adjacent to the inner surface 33 at the collar 30. The hole 34 is thus in position to receive bolts 36 passing therethrough, along with washers, typically with the bolts 36 also passing through holes 64 at ends 62 of the bladder 60 adjacent to the collar 30, so that the bolts 36 can provide at least a portion of the fastening system for securing the bladder 60 to the frustum 20.

It is conceivable in alternative embodiments that the bladder 60 could not be attached to the frustum 20, with just friction and an interference fit between the frustum 20 and the toroidally shaped bladder 60 keeping the frustum 20 from moving downstream past the bladder 60. However, preferably the fastening system is provided so that the bladder 60 and frustum 20 are attached together. Adhesives or other secondary fasteners can be utilized along with the bolts 36 if desired (or used in place of the bolts 36). The bolts 36 could also alternatively be replaced with other mechanical fasteners, such as rivets.

The taper 40 extends downstream from the collar 30. Preferably the taper 40 is welded to the collar 30 or formed along with the collar 30 for a rigid bond between the collar 30 and taper 40. The taper 40 includes an outer surface 41 opposite an inner surface 43 with a thickness of the taper 40 which preferably matches that of the collar 30. The taper 40 has a large end 44 adjacent to the collar 30 and a small end 46 at the downstream end 24 of the frustum 20. The small end 46 has a smaller diameter than large end 44. Preferably the taper 40 exhibits a constant rate of decrease in diameter as it extends from the large end 44 to the small end 46. However, a non-constant angle could be provided as an alternative. Such a non-constant angle could exhibit a steeper taper adjacent to the large end 44 than adjacent to the small end 46, or could exhibit a shallower taper adjacent to the large end 44 than adjacent to the small end 46.

The bulkhead 50 preferably closes off the frustum 20 so that fluid F cannot pass through the frustum 20. However, this bulkhead 50 can be modified to allow the plug 10 to act as a bypass plug, valve plug or other accessory plug for fitting within a pipeline P, such as a sensor array. The bulkhead 50 preferably has a perimeter edge 52 which is joined to the inner surface 43 of the taper 40 of the frustum 20, and the bulkhead 50 closes off the interior 26 of the frustum 20. However, options such as a small bypass 54 or a large bypass 56 can pass through the bulkhead 50 as shown, to provide the optional equipment such as that described above. Preferably the bulkhead 50 also allows a portion of the fill system 70 to pass therethrough to facilitate filling of the bladder 60 from a downstream and lower pressure side of the plug 10 (however, such fill system could feed filling fluid from an upstream direction as an alternative, and thus would not need to pass through the bulkhead 50).

The fill system 70 acts as a preferred form of fluid fill port and typically includes a tap 72 extending through the bulkhead 50 (for fill systems 70 which access the plug 10 from a downstream direction). The fill system 70 also includes a pressure line 74 which leads to a fill bore 76 passing through the wall of the frustum 20 and into an interior of the bladder 60. This pressure line 74 is coupled to the tap 72 (for fill systems 70 which provide fill fluid from a downstream direction). The tap 72 is typically provided with a fitting, such as a Schrader valve fitting similar to that which is provided on pneumatic vehicle tires, for convenient attachment of pressurized fluid lines thereto in a simple removable fashion. Filling fluid A can be air or can be some other gas or liquid fluid. In many instances, the fill fluid A is a liquid so that substantially incompressible characteristics of this fill fluid A can be beneficially utilized to secure the plug 10 and resist high pressure within the pipeline P.

With particular reference to FIGS. 1, 2, 5 and 6, details of the bladder 60 are described, according to this preferred embodiment. The bladder 60 preferably has a toroidal form completely surrounding the frustum 20. This bladder 60 generally includes an outer wall 66 opposite an inner wall 68 and with an interior therebetween. These walls 66, 68 can be separate portions of a continuous single wall having a downstream portion 69 and an upstream portion (somewhat like an inner tube for a non-tubeless vehicle tire). In the embodiment shown, the outer wall 66 and inner wall 68 are joined together through the downstream portion 69, but separately terminate at ends 62 which are adjacent to each other and located adjacent to the collar 30. The ends 62 could also be joined together similar to the downstream portion 69 if desired. As another alternative, the downstream portion 69 could be in the form of ends of the outer wall 66 and inner wall 68 which could then be fastened together.

The bladder 60 includes a fluid containing interior which is between the outer wall 66 and inner wall 68. The bladder 60 has sufficient length along the centerline of the plug 10 that the bladder 60 can be filled with fluid within the interior and have a diameter expand radially as such filling occurs. The walls 66, 68 are preferably formed of elastomeric material, such as rubber, formed of multiple plies and with a thick cross-section (e.g. about one inch, especially for the outer wall 66) to handle high pressures and the rugged environment existing within many pipelines P. As an alternative, the bladder 60 could be formed of flexible materials which are not necessarily elastomeric and still minimally function according to this invention.

The ends 62 of the bladder 60 preferably have holes 64 passing therethrough which are sized to receive the bolts 36 and are spaced apart similar to spacing between the holes 34 in the collar 30, so that when the bolts 36 pass into the holes 34 of the collar 30 and through the holes 64 in the bladder 60, the bolts 36 act as at least a portion of a fastening system to secure the bladder 60 to the frustum 20. As an alternative, the bladder 60 could be fastened to the taper 40, such as near the large end 44 of the taper 40, or the bladder 60 could be not fastened to the frustum 20, as described in detail above.

In use and operation, and with continuing reference to FIGS. 1, 2, 5 and 6, the plug 10 of the preferred embodiment is preferably used in the following exemplary manner. A pipeline P to be plugged is identified and a location for such plugging of the pipeline P is identified. The plug 10 with the bladder 60 in a deflated form is then placed into the location within the pipeline P where plugging of flow is desired. Such positioning can often occur through a manhole or other access upstream of the location for plug position, and then fed with a line coupled to the plug into the pipeline P, and amount of line is played out that matches a distance from the pipeline P access point to the location where the plug 10 is to be located. A compressed fluid line can also be fed along with the pipeline P to the plug 10. Such a fluid fill line can extend downstream within the pipeline P, or be fed into the pipeline P ahead of the plug 10, which fluid fill line can be separately accessed by entry into the pipeline P at a location downstream of the plug 10.

Once the plug 10 is positioned where desired, pressurized fluid is introduced through fill system 70 into an interior of the bladder 60, causing the bladder 60 to expand radially until it engages the wall W of the pipeline P. A nominal pressure is further introduced into the bladder 60 by further placement of fluid into the interior of the bladder 60 until a radial force C is provided between the bladder 60 and the wall W of the pipeline P. Due to friction between the outer wall 66 of the bladder 60 and the wall W of the pipeline P, this radial force C associated with the pressure within the bladder 60 causes the plug 10 to be initially held in position.

When fluid flow downstream through the pipeline P encounters the plug 10, this fluid flow is at least partially blocked by the plug 10. In some instances pressure can build up within the pipeline P upstream of the plug 10. This pressure exerts a force on the plug 10 tending to push the plug 10 downstream within the pipeline P. With the plug 10 of this invention, such forces initially push the frustum 20 downstream slightly. Due to the tapering form of the frustum 20, as the frustum 20 moves downstream slightly, it exerts a radial force on the bladder 60, because the bladder 60 will not slide with the frustum 20 in a downstream direction, but remains engaged against the wall W of the pipeline P.

As the frustum 20 moves downstream slightly and exerts this radial force on the bladder 60, the bladder 60 in turn exerts an additional radial force G against the wall W of the pipeline P. Thus, the bladder 60 is now engaging the wall W of the pipeline P a greater amount due to the pressure of fluid in the pipeline P and upstream of the plug 10. The greater the force exerted by the fluid F, the greater the additional radial force G between the bladder 60 and the wall W of the pipeline P, so that the plug 10 naturally responds to pressure within the pipeline P by holding itself more securely within the pipeline P.

The bladder 60 being increased in interior pressure by movement of the frustum 20 slightly downstream relative to the bladder 60, also causes the bladder 60 to become even more rigid and resist downstream motion of the frustum 20 further. Thus, the frustum 20 is prevented from pushing entirely through an interior of the bladder 60 inboard of the inner wall 68 of the bladder 60. By properly configuring the geometry of the bladder 60 and the taper 40 of the frustum 20, the plug 10 exerts a greater and greater radial force as greater and greater upstream pressure with the pipeline P is encountered. While such greater and greater radial forces by the plug 10 against the wall W of the pipeline P could eventually exceed the maximum containment force of the pipeline P, such force is limited by the pressure upstream of the plug 10 within the pipeline P which is typically limited by other pipeline P equipment, such as check valves, etc.

If excessive pressure upstream of the plug 10 is encountered within the pipeline P, the pipeline P may have its maximum design pressure exceeded upstream of the plug 10 with in the pipeline P, rather than due to excessive radial forces exerted by the plug 10 upon the pipeline P. Thus, the plug 10 has a built-in over pressure safety in that its radial force is correlated with pressure within the pipeline P. Initial fill fluid pressure only need be enough to initially set the plug 10 and hold it in place without upstream pressure. Then, as the plug 10 encounters upstream fluid F pressure, pressure within the bladder 60 increases, not due to fill fluid A pressure that might accidentally be set at too high of a pressure, but rather follows the pipeline P fluid F pressure to avoid over-pressurization and resulting potential pipeline P damage.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A pipeline plug, comprising in combination:
   a rigid tapering frustum having an upstream end opposite a downstream end;
   said upstream end having a larger width than a downstream end;
   a flexible bladder located adjacent to an outer surface of said frustum;
   said flexible bladder surrounding said frustum laterally;
   a fluid port passing into an interior of said bladder for expanding said bladder away from said outer surface of said frustum and into engagement with a pipeline wall;
   wherein said bladder includes an inner flexible wall and an outer flexible wall, with said interior of said bladder surrounded completely by said inner flexible wall and said outer flexible wall; and
   wherein said inner flexible wall of said bladder is located closer to a centerline of said frustum than said outer flexible wall and an outer surface of said upstream end of said frustum, such that movement of said frustum in a downstream direction pushes said bladder and said inner flexible wall radially outwardly.

2. The plug of claim 1 wherein said frustum has a circular cross-section lateral to a centerline of said frustum.

3. The plug of claim 2 wherein said frustum is radially symmetrical about said center line.

4. The plug of claim 1 wherein said bladder has a toroidal form.

5. The plug of claim 4 wherein said bladder is formed of elastomeric material.

6. The plug of claim 4 wherein said bladder is fastened to said frustum.

7. The plug of claim 1 wherein a bypass extends through an interior of said frustum along a path inboard of said outer surface of said frustum.

8. The plug of claim 7 wherein a bulkhead extends across said interior of said frustum within a plane intersecting a centerline of said frustum, said bulkhead having at least a portion of said bypass extending therethrough, said bulkhead closing off flow through said frustum other than through said bypass.

9. The plug of claim 8 wherein a fluid tap is located within said bulkhead, with a pressurized fluid line extending from said tap to a bore through said outer surface of said frustum and into said interior of said bladder.

10. The plug of claim 1 wherein said frustum includes a collar at said upstream end of said frustum with a cylindrical form, and a taper between said collar and said the downstream end of said frustum, said taper having a decreasing diameter as said taper extends away from said collar and towards a downstream end of said frustum.

11. A pipeline plug, comprising in combination:
    a rigid tapering frustum having an upstream end opposite a downstream end;
    said upstream end having a larger width than a downstream end;
    a flexible bladder located adjacent to an outer surface of said frustum;
    said flexible bladder surrounding said frustum laterally;
    a fluid port passing into an interior of said bladder for expanding said bladder away from said outer surface of said frustum and into engagement with a pipeline wall;
    wherein said bladder has a toroidal form;
    wherein said bladder is fastened to said frustum; and
    wherein said bladder includes two ends located adjacent to each other and opposite a downstream portion of said bladder, one of said two ends on an outer wall of said bladder and one of said two ends on an inner wall of said bladder, said two ends of said bladder each fastened to said frustum.

12. The plug of claim 11 wherein bolts pass through said two ends of said bladder and through portions of said frustum closer to said upstream end of said frustum than to said downstream end of said frustum, said bolts fastening said ends of said bladder to said frustum with said downstream portion of said bladder located downstream from said two ends of said bladder.

13. The plug of claim 12 wherein said frustum has a substantially cylindrical collar at said upstream end, with said frustum tapering to a smaller cross-sectional diameter on a taper portion of said frustum located between said collar and said downstream end of said frustum, said ends of said bladder fastened to said frustum at said collar of said frustum.

14. A method for plugging a pipe, including the steps of:
    placing a pipe plug into the pipe, the pipe plug having a rigid tapering frustum with an upstream end opposite a downstream end; the upstream end having a larger width than a downstream end; a flexible bladder located adjacent to an outer surface of the frustum; the flexible bladder surrounding the frustum laterally; and a fluid port passing into an interior of the bladder for expanding the bladder away from the outer surface of the frustum and into engagement with a pipeline wall;
    placing compressed fluid through the fluid port and into the interior of the bladder until the bladder expands into contact with a wall of the pipe; and
    including the further step of increasing pressure within the interior of the bladder by increasing pressure in the pipe upstream of the plug, causing the frustum to move downstream slightly and exert a radial outward force on the bladder and a radial force outward from the bladder and against the wall of the pipe.

15. The method of claim 14 wherein the frustum has a circular cross-section lateral to a centerline of the frustum, the frustum being radially symmetrical about the centerline of the frustum, and the bladder formed of elastomeric material.

16. The method of claim 14 wherein a bypass extends through an interior of the frustum along a path inboard of the outer surface of the frustum.

17. The method of claim 14 wherein the bladder includes an inner flexible wall and an outer flexible wall, with the interior of the bladder therebetween, the inner wall of the bladder located closer to a centerline of the frustum than the outer flexible wall and an outer surface of the upstream end of the frustum; and
    wherein movement of the frustum in a downstream direction pushes the bladder and the inner flexible wall radially outwardly.

\* \* \* \* \*